EXPENDABLE PHASE CHANGE DETECTOR DEVICE

Original Filed June 7, 1963 2 Sheets-Sheet 1

EXPENDABLE PHASE CHANGE DETECTOR DEVICE

Original Filed June 7, 1963 2 Sheets-Sheet 2

United States Patent Office

Re. 26,409
Reissued June 11, 1968

26,409
EXPENDABLE PHASE CHANGE DETECTOR DEVICE

Richard J. Hance, Philadelphia, Pa., assignor to Leeds & Northrup Company, a corporation of Pennsylvania Original No. 3,267,732, dated Aug. 23, 1966, Ser. No. 286,312, June 7, 1963, which is a continuation-in-part of Ser. No. 238,906, Nov. 20, 1962. Application for reissue Mar. 20, 1967, Ser. No. 628,514
17 Claims. (Cl. 73—359)

Matter enclosed in heavy brackets [ ] appears in the original patent but forms no part of this reissue specification; matter printed in italics indicates the additions made by reissue.

*ABSTRACT OF THE DISCLOSURE*

*An expendable phase change prefabricated detector device for use in obtaining a cooling curve of molten material outside of the melting furnace. The device includes well structure having a relatively small volume and open at the top thereof to receive and retain molten material placed therein. Temperature-sensing means is supported within the well structure and is provided with electrical conductors extending through the wall and carried by an extension on the well structure. The extension includes means for holding the electrical conductors in fixed position of predetermined polarity for engagement with associated contact structures of corresponding polarity in connecting the temperature sensing means to a measuring circuit.*

This is a continuation-in-part of the parent application, Serial No. 238,906, filed November 20, 1962, now abandoned.

This invention relates to a device for obtaining a cooling curve of molten materials and has for an object the provision of an expendable phase change detector particularly useful in industrial applications where phase change detection can be used as a quality control guide or for research purposes.

The present invention is particularly applicable to obtaining a cooling curve of molten metals such as cast iron or steel. For example, in the molding of gray iron castings, a study of solidification characteristics permits the determination of the carbon equivalent value of cast iron. The mechanical properties of gray iron depend to a substantial extent on its carbon equivalent value. Whether the iron solidifies gray as desired or as white iron will depend upon the carbon equivalent value. One method of determining the composition and hardness of iron is by chemical analysis as described in the article entitled, "Rapid Control Test for Carbon Equivalent," by D. E. Krause in the May 1962 issue of "Foundry." This article points out the deficiency in the chemical analysis results and describes a carbon equivalent test based on the measurement of thermal arrests or phase change temperatures as a sample of molten cast iron freezes outside of the melting furnace. The phase change temperatures correspond to initial separation of austenite from the melt liquid (liquidus) and final solidification of the remaining liquid of eutectic composition (solidus). Such tests were performed by using sand core molds each comprising a pair of half-sections with separate thermocouples which required assembly by the user and clamping of the molds during use. Such sand molds are of relatively complicated construction and include a substantially U-shaped chamber with an upper reservoir acting as an overflow cavity that permits the first metal poured into the mold to be used for preheating the thermocouple and sand from which the mold is constructed.

While the aforementioned sand molds have produced satisfactory results, nevertheless they have left something to be desired. The production of sand molds is time consuming and requires a certain amount of labor and care when inserting the separate thermocouple assembly. Additionally, particular care must be taken to insure connection of the thermocouple wires with the correct polarity. The present invention avoids the foregoing difficulties by providing a factory made *or prefabricated* expendable unit including as integral parts thereof a thermocouple with a reservoir or well structure adapted to be supported with the open end of the well structure disposed upwardly for receiving and retaining a molten material therein. The unit is of relatively low cost and is constructed as a completely assembled unit ready to be plugged in for use in a temperature measuring circuit.

In accordance with one aspect of the invention, there is provided an expendable phase change detector device for obtaining a cooling curve of molten material outside of the melting furnace comprising a body member adapted for vertical disposition and a temperature sensing means *permanently sealed to and* supported by the body member *so as to become an integral part thereof.* The temperature sensing means extends from one end of the body member a predetermined distance and has electrical conductors extending through at least part of the body member toward the opposite end thereof and forming plug-in contact structure accessible from the opposite end of the body member. Tubular wall structure having an open end is carried by the body member and together therewith forms an open end liquid-tight well around the temperature sensing means so that upon vertical disposition of the structure the well is adapted to receive and retain a quantity of molten material. The tubular wall structure has a length substantially greater than the predetermined distance which the temperature sensing means extends beyond the end of the body member which forms the bottom of the well. The tubular wall structure and body member are comprised of material having the characteristic of retarding the cooling of a sample of molten material to be received in the well at a rate that allows detection of the thermal arrests in accordance with the rate of response of the temperature sensing means. The depth of the well is related to the predetermined distance the temperature sensing means extends beyond the bottom of the well so as to maintain the temperature sensing means within the sample of molten material in the well and below any shrinkage cavity formed in the sample during cooling.

Where the body is constructed separately from the tubular wall structure, the outer surface of the body which is adapted to engage the inner surface of the tubular wall structure is provided with a taper which tapers from a large cross-section to a smaller cross-section, with the smaller cross-section being at the end of the body member from which the temperature sensing means extends to provide a tapered seat for the tubular wall structure.

For further objects and advantages thereof and for a more detailed description of the invention, reference is to be had to the following description taken in conjunction with the accompanying drawings in which.

Figure 1:
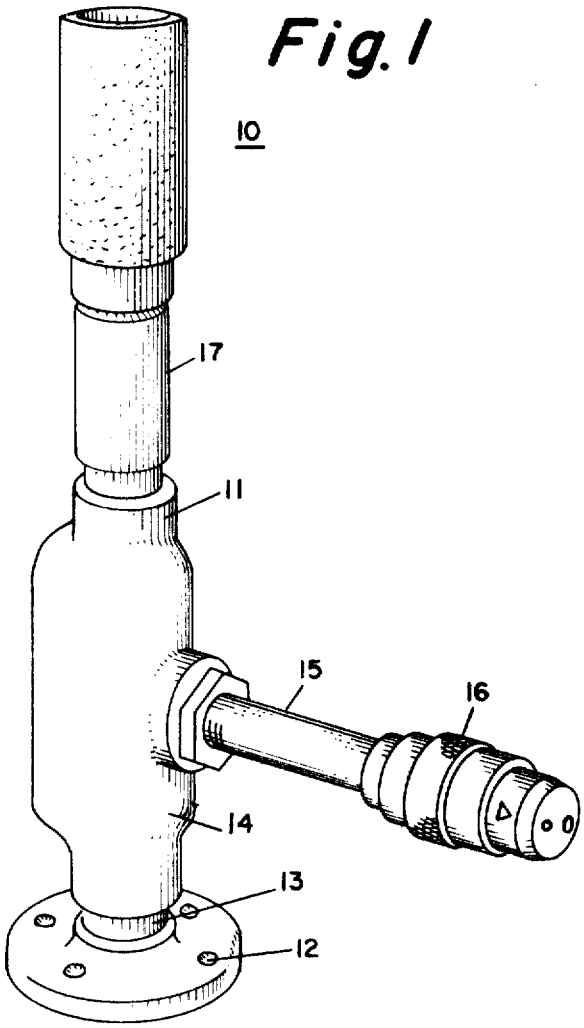
FIG. 1 is a perspective view of a test stand and plug-in detector embodying the invention.

Referring to FIG. 1, there is shown an expendable phase change detector device 10 supported at its lower end in a test stand 11. The test stand includes a base 12 which has been illustrated as a pipe flange connected by a threaded nipple 13 to a conduit box 14. The conduit box 14 is provided with a laterally extending conduit 15, the outer end of which is provided with a lug type electrical connector 16. The connector 16 has connected thereto lead wires 22, 23, FIG. 2, which extend through the conduit 15 and upwardly through the conduit box 14 into the fitting 17 which contains an electrical connector element the details of which are shown in FIG. 2.

Figure 2:
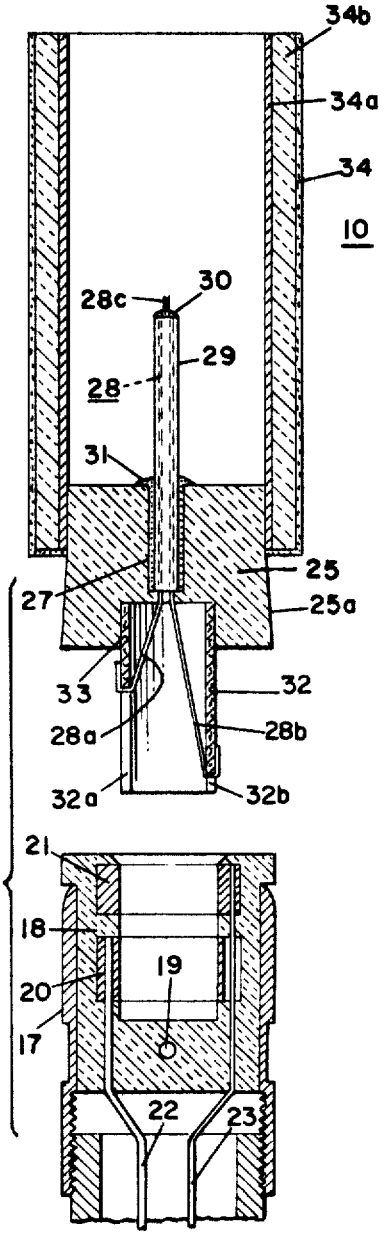
FIG. 2 is an exploded sectional view on an enlarged scale of a preferred form of well structure and electrical connections.

As may be seen in FIG. 2, the fitting 17 is provided with an insulator 18 retained in the fitting 17 by a pin 19. The insulator 18 may be made of any suitable electrical insulating material such for example as ceramic and is provided with a pair of spaced contact rings 20 and 21. One of the lead wires 22 is connected to ring 20 and the other lead wire 23 is connected to ring 21.

The device 10 as shown in FIG. 2 includes a body member 25 of ceramic having an opening therethrough within a counterbore-like cavity at 27 of a predetermined depth for positioning the temperature sensing means 28. The temperature sensing means 28 has been illustrated as a thermocouple comprising 22 gauge Chromel-Alumel wires 28a, 28b having ends twisted together at one end to form a heat responsive portion 28c with the free ends inserted in a two hole insulator 29. The insulator tube 29 may be made of any suitable material such, for example, as fused quartz. The heat responsive portion 28c extends beyond the end of the insulator 29 and the wires of the thermocouple 28 are sealed within the insulator 29 with a refractory cement such as Alundum cement 30. The lower end of the insulator tube 29 is seated in the cavity 27 and is [seated] *sealed* in place by Alundum or other suitable refractory cement 31. The lower ends of the thermocouple wires 28a and 28b extend through the hole in the body 25 and into a tubular insulator 32 which is received within a counterbore-like cavity 33 at the lower end of the body 25. The tubular member 32 is made of hard paper or other equivalent electrical insulating material and is provided with notches 32a and 32b for receiving the ends of the respective thermocouple wires 28a and 28b which are bent back to form electrical contacts. The notches 32a and 32b are axially displaced along the length of tube 32 a distance corresponding to the spacing of the cooperating contact rings 21 and 20 on the test stand 11. This construction insures that the proper polarity of the thermocouple connections with a measuring instrument will be maintained regardless of the orientation of the device 10. It is to be understood that the rings 20 and 21 and wires 22 and 23 will be made out of the same material as the thermocouple wires 28a and 28b. However, as will be understood by those skilled in the art, when the thermocouple wires are of noble metal, compensating lead wire materials may be used.

The body member 25 has been illustrated with the lower end thereof being of larger diameter than the upper end so as to provide a tapered seat 25a for receiving the lower end of the tubular wall structure 34. The tubular wall structure 34 and body 25 cooperate to form a liquid-tight well around the heat responsive portion 28c of temperature sensing means 28. By providing the body 25 with the aforementioned taper, the cylindrical wall 34 is pressed onto the body 25 sufficiently tight to provide a leak-proof well. The pressed fit of the tube 34 on body 25 is sufficiently tight to retain the tube in place in a manner similar to forming the tube integral with the body 25.

The tube 34 in a presently preferred form of the invention comprises an inner thin walled circular steel tube 34a. The outer surface of the steel tube 34a is covered with heat insulating material 34b such, for example, as ceramic impregnated asbestos tape.

In one embodiment of the invention, the steel tube 34a had an internal diameter of about 1½ inches, a wall thickness of .012 inch and was covered with a double layer of ceramic saturated asbestos tape approximately 0.1 inch thick spirally wound thereon. The metal tube was first coated with ceramic cement.

The length of the tube 34 is related to the distance which the heat responsive portion 28c extends beyond the end face of the body member 25 so as to produce a depth of well for receiving the sample of molten metal or other molten material which will maintain the temperature responsive portion 28c within the sample and below any shrinkage cavity formed by the sample during cooling thereof. In an embodiment particularly suited for obtaining the cooling curve of cast iron, a 4-inch tube was pressed onto a body 25 in a manner providing approximately a 3½ inch deep reservoir for the molten metal surrounding the heat sensitive portion 28c. The inside diameter of the metal tube 34a was approximately 1.62 inches and the temperature responsive portion 28c was positioned about 2⅛ inch below the open end of the well. Thus, it will be seen that the well structure is relatively small having a cubical content of the order of less than about ten cubic inches and that the temperature responsive portion projects a substantial distance above the bottom of the well, i.e., approximately one-third of the distance between the bottom and top of the well.

While the embodiment illustrated in FIG. 2 shows a device having a separable tube 34, it is to be understood that the tube 34 may be formed integral with the body member 25 with both the body 25 and tube 34 being of ceramic or equivalent material. A thin metal liner 34a may be inserted within the outer ceramic tube. It is further to be understood that the separable tube 34 of FIG. 2 may either be assembled at the point of manufacture or at the point of use as desired.

Figure 3:
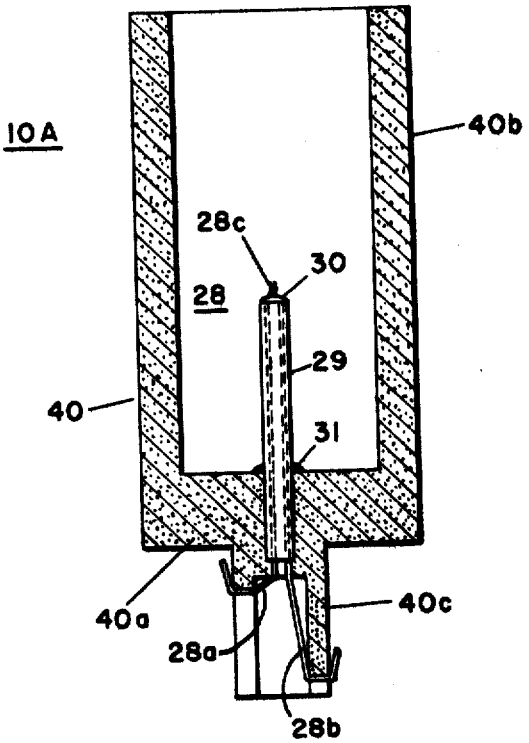
FIG. 3 is a sectional view of a modification of the plug-in detector.

Referring to FIG. 3 there is shown a modification of the expendable phase change detector device. The detector device 10a shown in FIG. 3 is a cup-shaped structure formed into a monolithic mass of sand and a resin binder. The cup-shaped structure 40 includes a bottom 40a and a side wall 40b which cooperate to provide well structure for receiving the molten material. The outer surface of the bottom 40a is provided with an extension 40c which is adapted to support the electrical contacts for the thermocouple. It has been found that the wall portions 40a, 40b and 40c of the well structure 40 may be relatively thin and still provide adequate strength for receiving the molten metal mass. In view of this, the well structure 40 may be produced by shell molding. In shell molding a thin shell mold is produced by covering a hot metal pattern or die with a mixture of sand and a resin binder. The resin binder is heat setting such as a phenol-formaldehyde resin binder. The thin shell mold may be produced in various ways, one of which is by blowing the sand and resin into the die cavity and the thin mold so formed is then capable of being hardened completely by heating for approximately three minutes at 300° C. After baking, the thin sand shell is then lifted from the pattern or die. While the well structure 40 is formed of sand, nevertheless, it is a self-supporting structure and does not need additional supports or clamps for the walls while receiving the molten metal. This is an advantage of the shell molding process over the ordinary core, sand molding technique which when combined with other features of applicant's invention provides a low cost plug-in expendable unit. For further reference as to the shell molding process, reference may be had to the publication "Tool and Manufacturing Engineering," volume 46, January 1961, and the references listed on page 116.

The temperature sensing means 28 shown in FIG. 3 is essentially the same as that shown in FIG. 2. It has been illustrated as a thermocouple comprising Chromel-Alumel wires 28a, 28b having ends twisted together at one end to form a heat responsive portion 28c with the free ends inserted in the two-hole insulator 29. The heat responsive portion 28c extends beyond the end of the insulator 29 and the wires of the thermocouple 28 are sealed within the insulator 29 with a refractory cement 30. The lower end of the insulator tube 29 extends into the bottom 40a of the well structure 40 and preferably is sealed in place by Alundum or other suitable refractory cement 31. The lower end of the thermocouple wires 28a and 28b extend through the bottom 40a and into the tubular portion 40c. Tubular portion 40c is provided with notches on opposite sides for receiving the ends of the respective thermocouple wires 28a and 28b which are bent back to form electrical contacts. The electrical contacts are adapted to engage the respective contact rings 21 and 20 on the test stand 11, the upper end of which is shown in cross-section in FIG. 2.

By molding the bottom 40a integral with the side wall 40b, there is avoided the possibility of any leakage between the two. Additionally, by molding the contact support 40c integral with the bottom 40a the number of assembly steps have been minimized. The weight of the device 10a shown in FIG. 3 is relatively small and this is an advantage from a shipping standpoint. It has been found that an unsupported monolithic wall of sand and resin binder having a thickness in the order of 0.1 inch is adequate to support the molten material as it is poured into the well structure and additionally for a time interval long enough for an outer metal shell to form before the mold beings to disintegrate.

It is to be understood that the invention is not limited to the forms which have been described and illustrated herein and that other forms thereof may be constructed within the scope of the appended claims.

What is claimed is:

1. An expendable phase change detector device adapted for vertical disposition for use in obtaining a cooling curve of molten material outside of the melting furnace comprising a body member, temperature sensing means supported by said body member and extending from one end of said body member a predetermined distance, said temperature sensing means having electrical conductors extending through at least part of said body member toward the opposite end thereof and forming plug-in electrical contact structure accessible from said opposite end of said body member, tubular wall structure carried by said body member at said one end thereof and together therewith forming an open end liquid-tight well around said temperature sensing means so that upon vertical disposition of the device said open end of said well is adapted to receive and said well retain a quantity of molten material, said tubular wall structure having a length substantially greater than said predetermined distance which said temperature sensing means extends beyond said one end of said body member which forms the bottom of said well, said tubular wall structure and body member being comprised of material having the characteristic of retarding the cooling of a sample of the molten material to be received in said well, the depth of said well being related to said predetermined distance said temperature sensing means [extend] *extends* beyond said bottom of said well so as to maintain said temperature sensing means within the sample of molten material in said well and below any shrinkage cavity formed in the sample during cooling.

2. An expendable phase charge detector device for use in obtaining a cooling curve of molten material according to claim 1 wherein said body member is formed integral with said tubular wall structure.

3. An expendable phase change detector device for use in obtaining a cooling curve of molten material according to claim 1 wherein said body member is formed integral with said tubular wall structure into a self-supporting structure from a mixture of sand and a heat setting resin.

4. An expendable phase change detector device for use in obtaining the cooling curve of molten material according to claim 1 wherein said temperature sensing means comprises a thermocouple, the heat-receiving junction of which is disposed along the axis of said body member.

5. An expendable phase change detector device for use in obtaining a cooling curve of molten material according to claim 1 wherein said body member and said tubular wall structure are each comprised of ceramic material.

6. An expandable phase change detector device for use in obtaining a cooling curve of molten material according to claim 5 wherein said tubular wall structure of ceramic material is provided with a thin metal liner.

7. An expendable phase change detector device adapted for vertical disposition for use in obtaining a cooling curve of molten material outside of the melting furnace comprising a body member, temperature sensing means supported by said body member and having a heat responsive portion extending beyond one end of said body member a predetermined distance, said temperature sensing means having electrical conductors extending through said body member toward the opposite end thereof and forming electrical contact structure accessible from said opposite end of said body member, tubular wall structure carried by said body member at said one end thereof and together therewith forming an open end liquid-tight well around said temperature sensing means so that upon vertical disposition of the device said open end of said well is adapted to receive and said well retain a quantity of molten material, said tubular wall structure having a length substantially greater than said predetermined distance which said heat responsive portion of said temperature sensing means extends beyond said one end of said body member which forms the bottom of said well, said predetermined distance being approximately one-third the distance between the bottom and open end top of said well so as to locate said heat responsive portion of said temperature sensing means a substantial distance from the bottom of said well, said tubular wall structure comprising a thin metal liner, the outer surface of which is covered with material having the characteristic of retarding the cooling of a sample of the molten material to be received in said well structure, the depth of said well structure being related to said predetermined distance said temperature sensing means extends beyond said bottom of said well so as to maintain said temperature sensing means within the sample of molten material in said well and below any shrinkage cavity formed in the sample during cooling.

8. An expendable phase change detector device for use in obtaining a cooling curve of molten material outside of the melting furnace comprising a body member, temperature sensing means protruding from a face of said body member with the heat-responsive portion thereof disposed in spaced relation to said face, electrical conductors in electrical connection with said temperature sensing means passing through at least a portion of said body member and terminating in electrical contact portion, and said body member having wall structure[,] adjacent said face which tapers gradually from a large cross-section to a smaller cross-section with the smaller cross-section being at the end of said body member nearest said face from which said temperature sensing means protrudes to provide a tapered seat, and an open-ended tube seated on said tapered seat in liquid-tight engagement to provide a receptacle for the molten material.

9. An expendable phase change detector device for use in obtaining a cooling curve of molten material outside of the melting furnace comprising well structure adapted for vertical disposition to hold a sample of molten material and having a relatively small cubical content of the order of less than about ten cubic inches with the wall structure of said well structure including material tending to retard cooling of a sample of molten material to be received in said well structure, heat sensing means supported substantially axially of said well structure at a point below any shrinkage cavity formed in the sample during cooling thereof, said wall structure tending to retard cooling at a rate that allows detection of the thermal arrests with said associated heat sensing means having a predetermined speed of response, and an electrical contact supporting member rigidly supported by the wall structure of said well structure with electrical conductors connected to said heat sensing means secured to said contact supporting member in a manner to form plug-in electrical contact means for connecting said device to a measuring circuit.

10. An expendable phase change *prefabricated* detector device for use in obtaining a cooling curve of molten material outside of the melting furnace comprising well structure of material and shape which retards the rate of cooling of a molten material poured therein, temperature sensing means supported from a wall of said well structure and extending a predetermined distance therefrom for disposition of a heat-responsive portion thereof substantially on the longitudinal axis of said well structure and spaced from the walls thereof, *said temperature sensing means being permanently sealed to said well structure so as to become an integral part thereof*, said well structure tending to retard cooling at a rate that allows detection of the thermal arrests in accordance with the rate of response of the temperature sensing means, said temperature sensing means having electrical conductors extending through said wall of said well and terminating in *electrical contact structures included in* plug-in electrical contact structure accessible exteriorly of said well and carried thereby, *said plug-in electrical contact structure also including an extension carried by and projecting exteriorly of said well adjacent the location where said electrical conductors extend through said wall, said extension having means for holding said contact structures in fixed position of predetermined polarity for engagement with associated contact structures of corresponding polarity in connecting said temperature sensing means to a measuring circuit*, and said well structure having a length such that said heat-responsive portion of said temperature sensing means is always completely surrounded by the molten material placed in said well and below any shrinkage cavity formed in said material upon cooling.

11. An expendable phase change detector device for use in obtaining a cooling curve of molten material according to claim 10 wherein said material from which said well structure is formed comprises a mixture of sand and a binder.

12. An expendable phase change detector device for use in obtaining a cooling curve of molten material according to claim 11 wherein said binder comprises a phenol-formaldehyde resin.

13. An expendable phase change detector device for use in obtaining a cooling curve of molten material according to claim 10 wherein said well structure comprises a monolithic thin sand shell formed from a mixture of sand and a phenol-formaldehyde resin binder.

14. An expendable phase change detector device for use in obtaining a cooling curve of molten material according to claim 10 including a stand for supporting said device with the well structure thereof in vertical position, said stand comprising a base having conduit means supported thereby in substantially vertical position, electrical contact structure disposed at the upper end of said conduit and adapted to cooperate with said plug-in contact structure of said device while supporting said device in substantially vertical position, and electrical conductors connected to the contacts of said stand, said electrical conductors of said stand extending downwardly through said conduit and being accessible from said stand for connection to a measuring circuit.

15. An expendable phase change detector device for use in obtaining a cooling curve of molten material outside of the melting furnace comprising well structure adapted for vertical disposition and having an open end at the top thereof to permit said well structure to receive and retain a molten material placed therein, temperature sensing means supported from the bottom of said well structure and extending a predetermined distance upwardly therefrom for disposition of a heat-responsive portion thereof substantially on the longitudinal axis of said well structure a substantial distance from the bottom of said well structure and spaced from the walls thereof, said well structure comprising a monolithic mass of sand and a resin binder and tending to retard cooling at a rate that allows detection of the thermal arrests in accordance with the rate of response of the temperature sensing means, said temperature sensing means having electrical conductors extending through said bottom of said well and terminating in plug-in electrical contact structure, and said temperature sensing means having a length such that said heat-responsive portion of said temperature sensing means is always completely surrounded by material placed in said well and below any shrinkage cavity formed in said material upon cooling.

16. An expendable phase change *prefabricated* detector device for use in obtaining a cooling curve of molten material outside of the melting furnace comprising well structure having a volume of the order of ten cubic inches or less and adapted for vertical disposition to hold a sample of a molten material placed therein, temperature sensing means extending through a wall of the well structure *and permanently sealed to and supported by said well structure so as to become an integral part thereof* for disposition of a heat responsive portion of said temperature sensing means within said well structure and spaced from the walls thereof, said well structure comprising a monolithic mass of non-metallic material molded into shape, open at one end, and free of seams, said material of said well structure tending to retard cooling of the molten material at a rate that allows detection of the thermal arrests of the molten material in accordance with the rate of response of the temperature sensing means, said temperature sensing means having electrical conductors extending through the wall of said well structure and having a length such that said heat responsive portion of said temperature sensing means is always completely surrounded by the material placed in said well structure and below any shrinkage cavity formed in said material upon cooling, *said electrical conductors terminating in electrical contact structures accessible exteriorly of said well, said well structure having an extension projecting exteriorly of the well adjacent the location where said electrical conductors extend through said wall, said extension having means for holding said contact structures in fixed positions of predetermined polarity for engagement with associated contact structures of corresponding polarity in connecting said temperature sensing means to a measuring circuit.*

*17. An expendable phase change prefabricated detector device for use in obtaining a cooling curve of molten material outside of the melting furnace comprising: well structure adapted for vertical disposition to hold a sample of a molten material placed therein, temperature sensing means extending through a wall of said well structure and permanently sealed to and supported by said well structure so as to become an integral part thereof for disposition of a heat responsive portion of said temperature sensing means within said well structure and spaced from the walls thereof, said well structure comprising a monolithic mass of non-metallic material molded into shape, open at one end, and free of seams, said material of said well structure tending to retard cooling of the molten material at a rate that allows detection of the thermal arrests of the molten material in accordance with the rate of response of the temperature sensing means, said temperature sensing means having electrical conductors extending through the wall of said well structure and having a length such that said heat responsive por-*

*tion of said temperature sensing means is always completely surrounded by the material placed in said well structure and below any shrinkage cavity formed in said material upon cooling, said electrical conductors having a predetermined polarity and terminating externally of said well structure in bare electrical contact portions spaced one from the other in predetermined orientation, a stand for supporting said device, said stand comprising a base having means for supporting said well structure in vertical position, and a pair of polarized electrical contacts carried by said stand, said pair of electrical contacts being fixed on said stand and having a spacing which corresponds to the spacing of said bare electrical contact portions of said electrical conductors for effecting an electrical connection of proper polarity therebetween in connecting said temperature sensing means to a measuring circuit.*

References Cited

The following references, cited by the Examiner, are of record in the patented file of this patent or the original patent.

UNITED STATES PATENTS

| | | | |
|---|---|---|---|
| 3,321,973 | 5/1967 | Anderson. | |
| 2,464,487 | 3/1949 | Chappell | 285—55 |
| 2,887,879 | 5/1959 | Vonnequt | 73—204 |
| 2,970,719 | 2/1961 | Brady | 285—55 |
| 3,007,988 | 9/1961 | Jaffe et al. | 73—359 |
| 3,048,642 | 8/1962 | Parker | 136—234 |
| 3,081,628 | 3/1963 | Salera | 73—204 |
| 3,099,922 | 8/1963 | Crocker | 73—341 |
| 3,169,401 | 2/1965 | Newman | 73—359 |

FOREIGN PATENTS

| | | |
|---|---|---|
| 921,027 | 8/1960 | Great Britain. |
| 1,253,390 | 1/1961 | France. |
| 801,604 | 1/1951 | Germany. |

OTHER REFERENCES

Temperature, Its Measurement and Control in Science and Industry: Edited by American Institutes of Physics. Published by Reinhold Publishing Corporation (1941). Pages 974–983 relied on.

Redshaw, H. A., et al.: Gray Cast Iron Control by Cooling Curve Techniques, in Modern Castings, vol. 41, No. 2, February 1962, TS 200 A7, page 95.

Modern Castings, vol. 41, No. 3, March 1962, pages 37–39, TS 200 A7.

DAVID SCHONBERG, *Primary Examiner.*

LOUIS R. PRINCE, *Examiner.*

FREDERICK SHOON, *Assistant Examiner.*